United States Patent [19]

Axtmann

[11] Patent Number: 4,462,905
[45] Date of Patent: Jul. 31, 1984

[54] DESILICATION OF GEOTHERMAL WATER

[76] Inventor: Robert C. Axtmann, 346 Burnt Hill Rd., Skillman, N.J. 08558

[21] Appl. No.: 424,742

[22] Filed: Sep. 27, 1982

Related U.S. Application Data

[62] Division of Ser. No. 218,844, Dec. 22, 1980, Pat. No. 4,378,295.

[51] Int. Cl.$^3$ ............................................. B01J 8/20
[52] U.S. Cl. ...................................... 210/189; 210/269
[58] Field of Search .................... 51/7, 164.1; 134/7; 210/792–796, 807, 189, 269, 270, 280, 661; 241/170

[56] References Cited

U.S. PATENT DOCUMENTS

| | | |
|---|---|---|
| 1,748,898 | 2/1930 | Peebles ................................ 210/270 |
| 2,742,381 | 4/1956 | Weiss et al. ......................... 210/661 |
| 3,358,937 | 12/1967 | Pearson et al. ..................... 241/170 |
| 3,436,343 | 4/1969 | Smith ................................... 210/189 |
| 4,260,426 | 4/1981 | Werfelman ......................... 210/794 |
| 4,281,605 | 8/1981 | Vemura et al. ..................... 210/661 |

Primary Examiner—Ivars C. Cintins
Attorney, Agent, or Firm—Richard T. Laughlin

[57] ABSTRACT

When Geothermal water, obtained from natural sources, delivers heat to energy conversion equipment or to heat transfer surfaces, the resulting effluents are supersaturated with amorphous silica. This invention relates to passing such effluents through a fluidized particle bed in which the silica deposits on the bed particles. The coated particles are removed from the system, the coatings removed and the particles are recycled to the fluidized bed.

1 Claim, 1 Drawing Figure

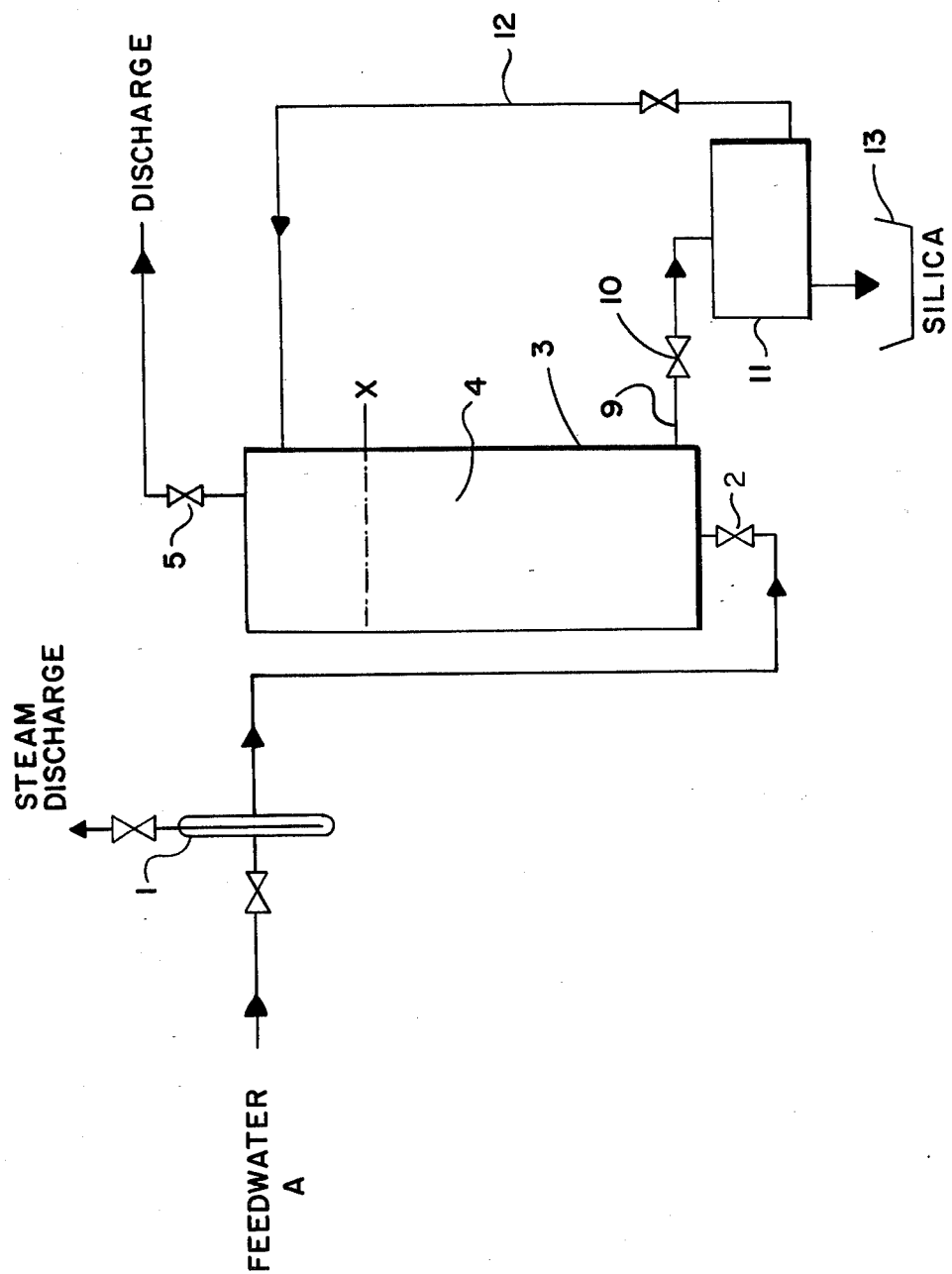

DESILICATION OF GEOTHERMAL WATER

This application is a division, of application Ser. No. 218,844, filed 12/22/80, now U.S. Pat. No. 4,378,295.

BACKGROUND OF THE INVENTION

Geothermal water is a potentially important source of energy. Two major problems in utilizing geothermal water are corrosion and scaling. The major contributor to scale formation is amorphous silica. Silica exists as dissolved silicic acid or silicic acid salts in deep hydrothermal fluids at concentrations that correspond to the solubility of quartz at the appropriate temperature pHs. The concentrations of silica by weight in such fluids is less than 0.2%. As the fluid rises to the surface and is cooled and/or flashed, the silica concentrations may exceed, many times over, the solubility of the amorphous form and precipitation occurs via the formation of polymeric silica structures. A number of installations have suffered operating problems that follow precipitation of the silica in well liners and equipment. The mechanism of polyerization and its relationship to scale buildup are not well understood. Many methods have been proposed over the years for removal of the silica from such waters. Typical types of processes are the addition of quicklime, which precipitates silica as calcium silicates, use of electrical potentials and dilution with fresh water.

Reinjection at liquid dominated geothermal fields is the obvious method to reduce drastically environmental impact. In addition, it may reduce ground subsidence rates and could decrease the rate of depletion of the natural resource by replacing unused mass and enthalpy. On the other hand, the useful reservoir lifetime might be foreshortened if reinjected silica was to precipitate in the aquifer and reduce the latter's permeability. However, gaps in the knowledge of silica chemistry have militated against routine reinjection. Despite more than three decades of investigation, neither the mechanism not the kinetics of silica polymerication have yet been characterized satisfactorily.

In my article which appeared in The AIChE Journal volume 22, No. 5, Sept. 1976, page 817, I described a novel approach to the elimination of silica scaling in a heat exchanger tested by Kunze et al. In this test a synthetic geothermal fluid transferred heat to a second working fluid using a fluidized bed of sand particles as the heat exchange medium. The abrasive action of the sand effectively eliminated scale buildup on the heat transfer surfaces, and high heat transfer coefficients were maintained. In a paper given by me at the Proceedings of the Second United Nations Symposium on the Development and Use of Geothermal Resources, San Francisco, CA. on May 20-29, 1975, Volume 2, page 1323-1327 (1976) I suggested the possibility of passing supersaturated solutions through a sand filled, fluidized bed, heat exchanger in which the presence of microscopic nucleation centers might accelerate the precipitation of the silica from the solution.

Liquid fluidized beds have not been utilized to removed a dissolved species. On the other hand such systems have been utilized to remove suspended solid particles, some of which may result from a chemical reaction. Such a system is the removal of carbonic acid species from sea water by the addition of slaked lime as shown in U.S. Pat. No. 3,075,828 issued on Jan. 29, 1963 to Tsuneo Kato, Iwao Kanuo and Kenji Takeo to create a suspension which is passed through a fluidized bed.

SUMMARY OF THE INVENTION

It is an object of this invention to provide a commercial method for removing silica from geothermal water. Another object of the invention is to provide a method of continuously removing silica from geothermal water prior to its reinjection into a subsurface reservoir or dispersal at the earth's surface. Other objects and the advantages of the invention will appear from the following detailed description.

This invention relates to the removal of dissolved silica from geothermal waters, waste or virgin, that have been obtained from natural sources or from so-called "hot dry rock" sources. For the latter case, water is added to man-made fractures in deep rock formations and serves as a heat transfer medium between the hot rocks and energy conversion equipment.

The process operates on aqueous solutions that are supersaturated with respect to amorphous silica, i.e., solutions in which the silica concentration exceeds the solubility of amorphous silica at the process conditions. Such solutions are produced, as an example, by flashing a portion of the original solution by reducing the temperature of the solution or by both processes simultaneously or sequentially. Silica concentrations of interest are generally in the range of from 400 to approximately 1200 ppm.

The supersaturated silica solution is passed through a fluidized bed of solid particles. As the solution is passed through the bed the particles become coated with silica. In such a system the coating growth on the particles is uniform as contrasted with a packed bed wherein the growth is uneven along the length of the bed.

The more effective operation of the invention is obtained with low bed voidages i.e., the least free space between particles. Care must be exercised, to prevent the particles from sticking together which materially interferes with the process and could block the flow. A voiding of about 0.4 to 0.6 is preferred. A portion of the supersaturated fraction deposits chemically as amorphous silica on the surface of the particles. Monomer additions to the growing surface of a suspension of particles is limited by monomer diffusion at low particle densities i.e., number of particles per unit volume, and by a first order chemical reaction at high particle densities.. It is believed that the motion of the particles enhances the depositing of the amorphous silica on the particles. The treated water with reduced silica content can then be safely reinjected into its source. The particles coated with silica are removed from the fluidized bed and subjected to a mechanical separation operation to remove the coating, and then the particles substantially free from the coating, are recycled to the fluidized bed. This system allows the fluidized bed to operate continuously.

If the particles in the bed were permitted to accumulate deposited silica indefinitely the waste water feed rate would have to increase continuously to afford proper expansion of the bed. In a 500 tons per hour facility that removed 100 ppm of $SiO_2$, the deposition rate would be 1.2 tons per day onto approximately 10 tons of sand.

The number of monomer molecules deposited per unit time is expressed by $$d\Omega/dt = k_o CS - \nu n_s S$$

wherein S (cm$^2$) is the surface area of the particles, $n_s$ (cm$^{-2}$) is the areal concentration of deposited monomers, C (cm$^{-3}$) is the monomer concentration in solution in the water, $k_o$ (cm-sec$^{-1}$) is a surface rate constant and $vn_sS$ is the rate of dissolution with v a frequency (sec$^{-1}$).

THE DRAWING

A detailed description of the process and apparatus to be utilized will be given with reference to the drawing wherein the FIGURE is a flow diagram of the process.

DETAILED DESCRIPTION

The geothermal water of a temperature of about 50° to about 200° C. is supplied from source A and fed through a steam separator 1 into the bottom valve 2 of a sand column 3. The sand column has a layer of sand 4 extending in operation to approximately three quarters of the height of column 3. The height is generally indicated as x in the drawing. The water passes through the sand particles and the contact of the sand particles causes the dissolved silica in the water to coat uniformly the sand particles. The water is then passed through exit valve 5 and in reinjected into its source i.e. the ground. Alternatively, the hot fluid could be used as a fluid preheater in an electrical plant with a closed working fluid cycle or for a process heat application or even for conventional comfort heating.

It is important to maintain the level of the bed at an elevation lower than that of the water line. This arrangement prevents the hot fluid from flashing to steam inside the bed and destroying the hydraulic conditions necessary for operation. The steam separator can be used to adjust the pressure of the fluid to the bed, the temperature of the fluid being a function of the separation pressure. Flashing in the bed can also be prevented by cooling the bed with cooling coils within the bed. A similar result can be obtained by utilizing a booster pump in the line to increase the pressure of the fluid.

It is essential to the invention for a sustained continuous operation to keep the particles in the fluidized bed at a relatively uniform, constant size to obtain the desired amount of silica separation from the fluid. For this purpose the sand is recycled to remove all, or a substantial portion, of the silica polymer coating. This can be done by passing quantities of the coated sand through conduit 9 and a control 10 into separator 11. The coated sand particles are conveyed to the separator by screw conveyor or the like. After removal of the coating, the sand is returned through conduit 12 to chamber 3. The fine silica coating residue is separated from the sand and the sand recycled without the coating residue to the fluidized column, perferably at the top of the column. The removed coating is passed to a collection hopper 13. This silica coating is very fine, high grade silica which has a variety of uses such as in glass making, ceramics and the like.

As an alternate procedure, the coating on the sand particles can be dissolved in a strong base such as sodium hydroxide and the resulting solution separated from the coating free sand particles.

A typical arrangement for a fluidized bed would be a chamber approximately three meters in diameter which could treat geothermal water at the rate of approximately 200 tons per hour. Although the size of the unit can vary, units having a capacity of from about 50 to about 1200 tons per hour would have good utility.

Although this embodiment was described with the utilization of the sand particles, other particles can be used such as aluminum, feldspar, granite, hematite, slag, coke, glass or any other hard material with a specific gravity greater than water, preferably specific gravity of at least 2.0, and insoluble in the water. The particles may be in the form of chips, beads, pellets, and the like rarely with a maximum dimension exceeding 10 millimeters. Average particle diameters from 0.2 to 1.0 millimeters are preferred with narrow particle size distribution to insure proper bed operation. The ability of the sand particles to remove the dissolved silica can be materially improved by adding concentrations of inorganic ions such as sodium, magnesium, calcium and the like to the bed.

The flow of the geothermal water through the fluidized chamber is adjusted in relation to several process factors such as the size and specific gravity of the particles used, and the density, viscosity, and velocity of the water. Generally, a superficial fluid velocities of 1 to 10 cm. per second is preferred.

The coated sand is preferably removed from the bottom of the bed chamber where the heavier coated particles of sand will migrate. Protions of the sand, as indicated, are removed from the chamber and sent to an apparatus for separating the coating from the sand particles and then recycled to the fluidizing chamber. This removal system can be any of the standard equipment used for removing coatings. Typical of such apparatus is a ball mill which grinds or abrades the coating from the surface of the sand particles. Balls of approximately one half inches in diameter can be used effectively. Since sand has a density of 2.7 and the silica coating about 2.2 the two components can be readily separated. The residue of the coating is passed to a storage bin and the sand, freed from its coating, is returned to the fluidized chamber by any typical conveyor means such as a screw conveyor. It is preferred that this recovered sand be added at the top of the fluidized chamber.

The dimensions of the fluidized bed to be utilized will depend, to a large measure, on the flow rate of geothermal water. It is desirable, for the economy realized, to utilize the velocity of the water from its natural source. Such force can be controlled by the size of the conduit and by use of suitable valves.

As a general rule, the diameter of the fluidized bed is constrained by the superficial fluid velocity required to expand the bed to the desired voidage. The diameter therefore is fixed by the waste water flow-rate, the bed particle size and the water temperature insofar as the latter affects the fluid viscosity and density. Once the diameter is set the height of the bed is determined by the residence time required to produce the desired reduction in silica concentration. The height is also a function of the deposition rate within the bed and hence also of the water pH, the bed particle size and voidage, the silica concentration in the waste water and the temperature. As an illustration, wide fluctuations in the flow would be allowed in a bed at a voidage near 0.5. For a sand particle of a diameter of about 0.027 cm. the flow can vary as much as 25%.

When the water enters the bed it is near the flash point and the drop of pressure across the bed could cause the water to flash. It is essential therefore, to keep the temperature of the water at a temperature to minimize this possibility. As indicated, one method of accomplishing this is to insert cooling coils in the fluidized bed. Another method is the reduction of the sand temperature during the recycling. The best method, however, is to locate the bed below the elevation of the steam separator so that the increased pressure, due to the acceleration of gravity, will prevent flashing.

The construction of the fluidized chamber is not critical to the invention. Typical of such construction is shown in U.S. Pat. No. 3,374,052 issued Mar. 19, 1968 to Fan & Wen. Such apparatus usually comprises a vertically extending column providing a cyclindrical bed section supported above a fluidized distribution plate or other means for introducing the water to be treated at the bottom of the bed. In general, the water velocity must be greater than the minimum fluidization velocity for the particular particles being utilized in the fluidization chamber. The water should have an upward velocity of at least two times the minimum fluidization velocity for the bed. A preferred range is 3 to 10 times.

The method of the invention is illustrated by the following example:

EXAMPLE 1

Geothermal water (from a source such as a steam separator at the Ohaki field at Broadlands, New Zealand) ladened with soluble silica at approximately 770 ppm concentration at approximately 120° C. and pH of 8.0 is fed at a flow rate of about 300 tons per hour into the bottom of a fluidizing chamber containing particles of sand. The sand is approximately 52 to 60 mesh (diameter of 0.027 cm.) The bottom of the bed is approximately 3 meters below the output of the steam separator. The chamber is approximately 0.9 meters high and 4.2 meters in diameter. The rate of flow keeps the sand in a fluidized state at a voidage of about 0.5. As the water passes over the sand particles a coating of silica polymer forms on the particles. A portion of the coated particles is removed from the bottom of the fluidized chamber and fed into a ball mill containing steel balls of approximately one half inch in diameter. The balls in the mill abrade the coating from the sand particles. The sand is then separated from the removed coating by floation and returned to the top of the bed by a screw conveyor. Approximately 120 ppm reduction in silica was obtained in 81 seconds contact with the bed.

Any departure from the foregoing description which conforms to the present invention is intended to be included in the scope of the claims.

What is claimed is:

1. An apparatus for reducing the dissolved silica content of geothermal fluid to allow reinjection into its source which comprises, a particle fluidizing chamber, particles in said chamber, conduit means for conveying said fluid to said chamber at a sufficient rate to maintain said particles in a fluidized state and causing the coating of said particles with silica from said fluid, a conduit means located at the top of said chamber for conveying treated fluid from the particle fluidizing chamber, a conveying means located adjacent the base of said chamber for removing a portion of said coated particles from the chamber, a ball mill for removing said coating from said removed particles, conveying means for returning said particles from which the coating has been removed to the top of said chamber and means for controlling the temperature or pressure of said fluid conveyed to said chamber to prevent flashing of the fluid in the chamber.

* * * * *